(12) United States Patent
Ramiz et al.

(10) Patent No.: US 7,080,243 B2
(45) Date of Patent: Jul. 18, 2006

(54) METHOD AND SYSTEM FOR COMPARING FIRMWARE IMAGES

(75) Inventors: Mohammad A. Ramiz, Houston, TX (US); Shajiuddin A. Mohammed, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 460 days.

(21) Appl. No.: 10/439,141

(22) Filed: May 15, 2003

(65) Prior Publication Data

US 2004/0230785 A1 Nov. 18, 2004

(51) Int. Cl.
*G06F 9/00* (2006.01)
(52) U.S. Cl. ............... 713/1; 713/2; 713/100
(58) Field of Classification Search ........... 713/1, 713/2, 100
See application file for complete search history.

(56) References Cited

U.S. PATENT DOCUMENTS

| | | | | |
|---|---|---|---|---|
| 5,479,610 | A * | 12/1995 | Roll-Mecak et al. | 714/25 |
| 6,085,333 | A * | 7/2000 | DeKoning et al. | 714/7 |
| 6,209,060 | B1 * | 3/2001 | Machida | 711/114 |
| 6,425,079 | B1 * | 7/2002 | Mahmoud | 713/2 |
| 6,442,067 | B1 * | 8/2002 | Chawla et al. | 365/185.11 |
| 6,675,258 | B1 * | 1/2004 | Bramhall et al. | 711/114 |
| 6,751,681 | B1 * | 6/2004 | Torii et al. | 710/8 |
| 6,904,457 | B1 * | 6/2005 | Goodman | 709/221 |
| 6,944,854 | B1 * | 9/2005 | Kehne et al. | 717/168 |
| 2002/0138567 | A1 * | 9/2002 | Ogawa | 709/203 |
| 2004/0030877 | A1 * | 2/2004 | Frid | 713/1 |
| 2004/0076043 | A1 * | 4/2004 | Boals et al. | 365/200 |

* cited by examiner

*Primary Examiner*—Chun Cao
*Assistant Examiner*—Vincent Tran

(57) ABSTRACT

A method and system for comparing firmware images of add-in cards of a computer system, and updating if difference exist.

13 Claims, 4 Drawing Sheets

METHOD AND SYSTEM FOR COMPARING FIRMWARE IMAGES

BACKGROUND

Computer systems, like home computers or high-end computers operated as servers, utilize firmware. Firmware may be programs executable by a processor, but the programs may be stored in non-volatile solid-state memory, such as read-only memory (ROM). In computer systems such as these, the firmware may provide functionality such as low level input/output programs, power-on self tests (POST) procedures, and the like.

Add-in cards or devices of a computer system may rely on their own firmware. These add-in devices may comprise modems, network interface cards (NICs), graphics drivers, disk driver controllers, and the like. In cases where multiple add-in devices of the same family are present, differing firmware versions and/or release numbers may cause incompatibilities or inoperability among the multiple devices.

Updating firmware, whether of the computer system or add-in cards, may be a time-consuming and labor-intensive process. Updating may require booting the computer system from an externally-supplied device, such as a floppy disk drive or a CD ROM, copying an updated firmware image from the externally-supplied device into the computer system, and then flashing or updating the image into the appropriate non-volatile device.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components and methods. As one skilled in the art will appreciate, computer companies may refer to components and methods by different names. This document does not intend to distinguish between components and methods that differ in name only. In the following discussion and in the claims, the terms "including"and "comprising"are used in an open-ended fashion, and thus should be interpreted to mean "including, but not limited to . . . ". Also, the term "couple"or "couples"is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

At least some of the embodiments of the invention were developed in the context of add-in cards being drive array controllers in a computer system. Embodiments of the invention discussed in the following specification are, therefore, related to the developmental context; however, the systems and methods described herein are not limited only to utilizing the techniques with respect to drive array controllers. Many other add-in cards, devices, and systems within a computer system may utilize the methods and systems described herein.

Figure 1:
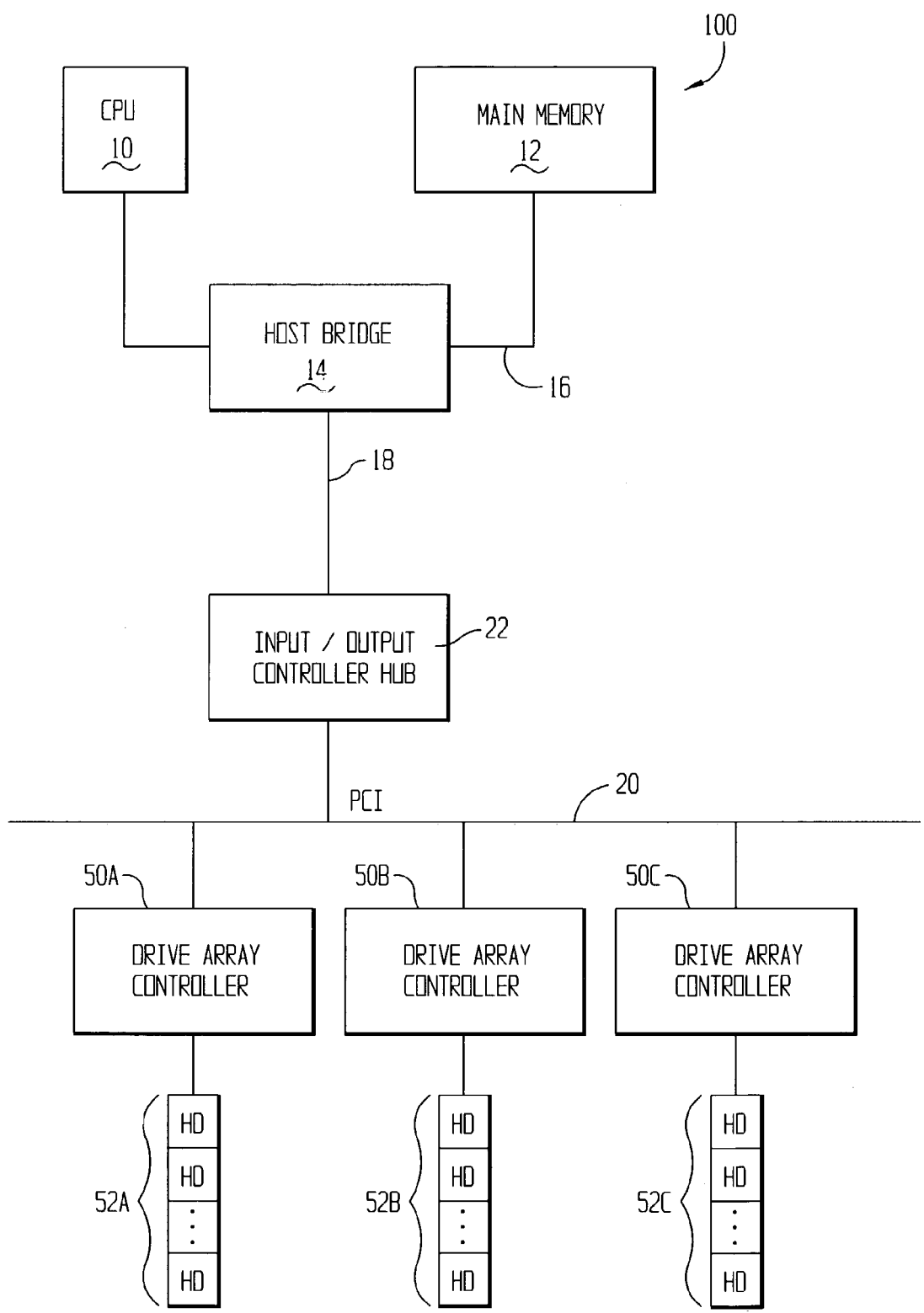
FIG. 1 illustrates a computer system constructed in accordance with embodiments of the invention.

FIG. 1 illustrates a computer system 100 constructed in accordance with embodiments of the invention. Computer system 100 may be any type of computer system, such as, but without limitation, a laptop computer, a personal computer, a stand-alone computer operated as a server, a blade server in a rack with a plurality of other servers, and the like. The computer system 100 may comprise a central processing unit (CPU) 10. The computer system 100 may comprise a single CPU 10 as illustrated, or may comprise a plurality of CPUs arranged in a configuration where parallel computing may take place. The CPU 10 may couple to a main memory array 12, and a variety of other peripheral computer system components, through a bridge device 14. The CPU 10 may comprise any available processor.

The main memory array 12 may couple to a host bridge 14 through a memory bus 16, and the host bridge 14 may comprise a memory control unit (not specifically shown) that controls transactions to the main memory array 12 by asserting the necessary control signals during memory accesses. The main memory array 12 may function as the working memory for the CPU 10 and may comprise any memory device or array of memory devices in which programs and data may be stored. The main memory array 12 may comprise any suitable type of memory such as dynamic random-access memory (DRAM), or any of the various types of DRAM devices such as synchronus DRAM (SDRAM), extended data output DRAM (EDO-DRAM), or RAM-bus DRAM (RDRAM).

In at least some embodiments of the invention, computer system 100 may be a server system, and therefore may not have a dedicated display device. If the computer system 100 did have a dedicated display device, such a device may be implemented by coupling a graphics driver add-in card to the host bridge 14 by way of an Advanced Graphics Port (AGP) bus or other suitable bus. Alternatively, the graphics driver card may couple to a primary expansion bus 18, or one of a variety of secondary expansion buses, for example Peripheral Components Interconnect (PCI) bus 20. Likewise, computer system 100 may not comprise a dedicated keyboard and pointing device; however, these devices may be utilized, and if present they may couple to the CPU by way of a controller (not specifically shown) coupled to the PCI bus 20.

Computer system 100 may also comprise a second bridge logic device 22 that may bridge the primary expansion bus 18 to various secondary expansion buses, such as the PCI bus 20. The second bridge logic device may, in some embodiments, be referred to an Input/Output Controller Hub (ICH). Any available chipsets may be utilized to implement the bridge logic devices, such as chipsets provided by Intel Corporation and ServerWorks, Inc. The primary expansion bus 18 may comprise a Hub-Link bus, which is a proprietary bus of the Intel Corporation; however, computer system 100 is not limited to any particular type of primary expansion bus, and thus other suitable buses may be equivalently used.

FIG. 1 also illustrates three add-in cards being drive array controllers 50A, 50B and 50C. The drive array controllers 50 may couple to the ICH 22 by way of the PCI bus 20. Each drive array controller 50A, 50B and 50C may also couple to a plurality of hard drives 52A, 52B and 52C, respectively. Each drive array controller 50 may perform data reads, data writes and other necessary data manipulation to implement hard drive control functionality, such as in a Redundant Array of Independent Disks (RAID) system. This functionality may be transparent to the remaining portions of the computer system 100. While FIG. 1 illustrates only three drive array controllers 50, the computer system 100 may support any number of these controllers.

Figure 2:
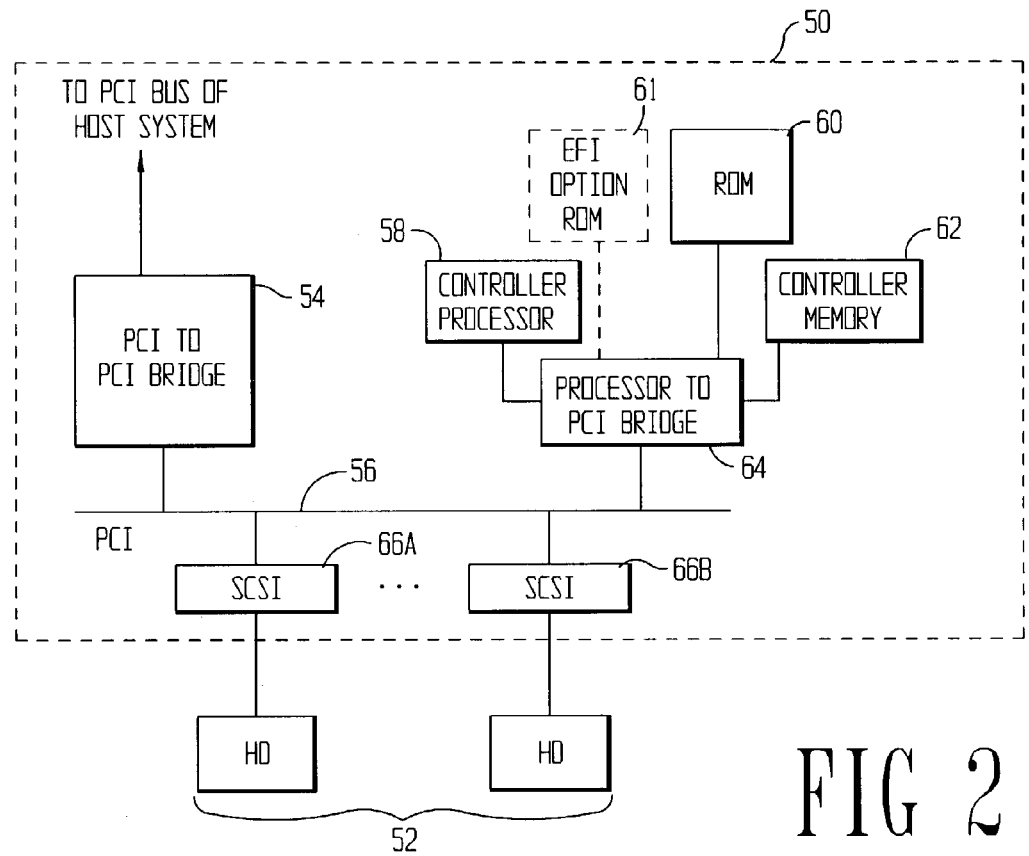
FIG. 2 illustrates a drive array controller in accordance with embodiments of the invention.

FIG. 2 illustrates, in block diagram form, a drive array controller 50 in accordance with embodiments of the invention. The drive array controller 50 may couple to the PCI bus 20 of computer system 100 by way of a PCI-to-PCI bridge 54. The drive array controller 50 may therefore have a local PCI bus 56, where the term "local" refers to the PCI bus residing within the drive array controller 50. The drive array controller 50 may also comprise an array processor 58, which may couple to a ROM 60 and an array controller memory 62 by way of a processor-to-PCI bridge 64.

The controller processor 58 may execute programs that reside on ROM 60 by copying the programs to the array controller memory 62. Executing programs stored in the ROM 60, the controller processor 58 may implement functionality, such as operating the hard drives 52 as a RAID system. The controller processor 58 may comprise any available processor, such as a Power PC® 405 processor manufactured by IBM. The controller processor 58 may couple to each of a plurality of hard drives 52, by way of a Small Computer System Interface (SCSI) component 66. While FIG. 2 only shows two hard drives 52 and two SCSI components 66, any number of hard drives and SCSI components may be equivalently used, including multiple hard drives coupled to a single SCSI component.

Referring to FIG. 1 and 2, the computer system 100 may comprise several drive array controllers 50, with each drive array controller 50 possibly comprising a ROM device 60 storing a firmware image to be executed by the controller processor 58. It is possible that the firmware images across multiple drive array controllers 50 may vary. Some of the reasons for the variation may be, without limitation: newer drive array controllers may be installed having later versions of firmware; and some drive array controllers 50 may have had their programs updated (to provide added functionality or to fix known problems). Regardless of the reason, inconsistencies between the firmware images of the drive array controllers 50 may cause interoperability problems, inoperability, or improper operation.

Drive array controllers 50, in accordance with embodiments of the invention, may have the capability of reading one or more of a vendor identification number, a product identification number and a firmware version number from each of the other drive array controllers 50 in the computer system 100. If any of the drive array controllers 50 within the same family of controllers have different firmware versions than the testing array controller, the testing array controller may flash a copy of its firmware to the other array controller(s). A discussion of a mechanism by which this may occur requires a brief digression into the relationships between hardware and software in exemplary computer system 100.

Intel Corporation has defined a specification, known as the Extensible Firmware Interface (EFI) specification, that defines a model for the interface between an operating system of a computer and the computer system's hardware. As of the writing of this specification, EFI version No. 1.10, released Jan. 7, 2003, is the latest version. This EFI specification may be obtained from the Intel. Before proceeding, it should be understood that while at least some of the embodiments of the present invention may be implemented in a system that is EFI compliant, the systems and methods are equally applicable in non-EFI-compliant systems.

Figure 3:
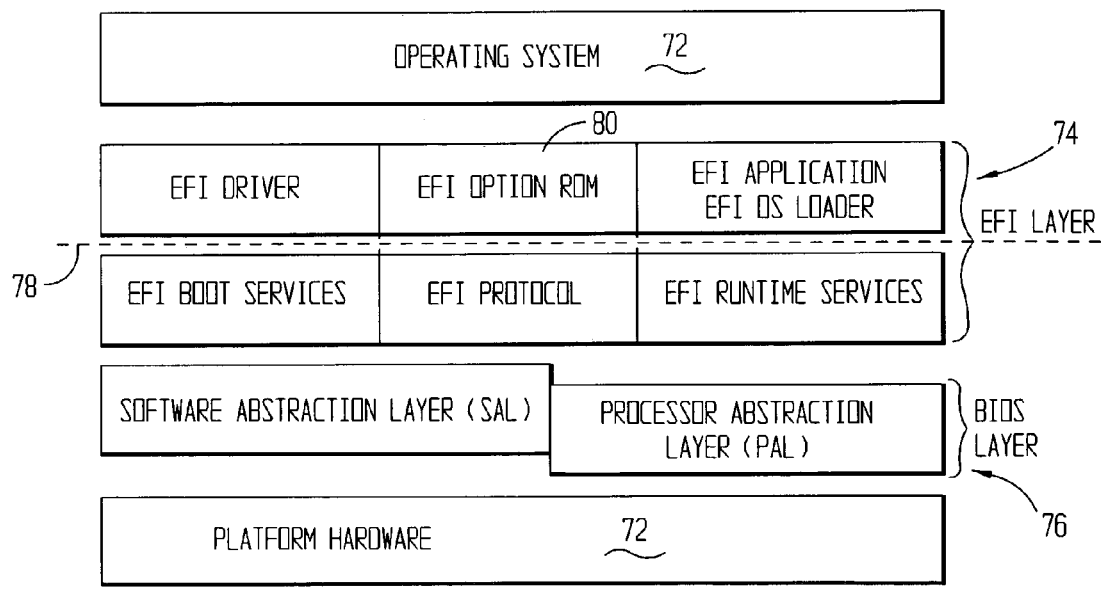
FIG. 3 illustrates, in block diagram form, interaction of various software layers existing between the platform hardware and an operating system in accordance with embodiments of the invention.

FIG. 3 illustrates, in block diagram form, interaction of various software components of an EFI-compliant system, and how these components relate the operating system to the hardware. More particularly, the operating system 70 may perform operations on the platform hardware 72 using a plurality of abstraction layers, such as EFI layer 74 and BIOS layer 76. For example, and without limitation, for an operating system to perform platform hardware-based functions, the operating system 70 may need to invoke application programming interfaces (APIs) in both the EFI layer 74 and BIOS layer 76. The blocks of FIG. 3 below dashed line 78 may be programs stored on non-volatile memory on the physical hardware 72. By contrast, programs of the EFI layer 74 above the dashed line 78 of FIG. 3 may be physically stored in locations other than the motherboard, such as on non-volatile memory of add-in cards, like drive array controllers. The EFI option ROM 80 block may thus represent a plurality of programs that reside on add-in devices coupled to the platform hardware 72.

During pre-boot procedures (before the operating system is given control of the computer system), various pieces of firmware may be executed. The EFI specification may allow programs in each EFI option ROM to execute in the pre-boot time frame to perform specific tasks. Thus, an EFI option ROM in each of the drive array controllers 50, for example, may be given an opportunity during the pre-boot sequence to execute programs on the CPU 10 of the host computer system 100. In accordance with embodiments of the invention, ROM 60 within each drive array controller 50 may contain EFI option ROM programs relating to checking and possibly updating firmware in each of the drive array controllers 50. Alternatively, an independent EFI option ROM 61 may be used (FIG. 2).

Figure 4A:
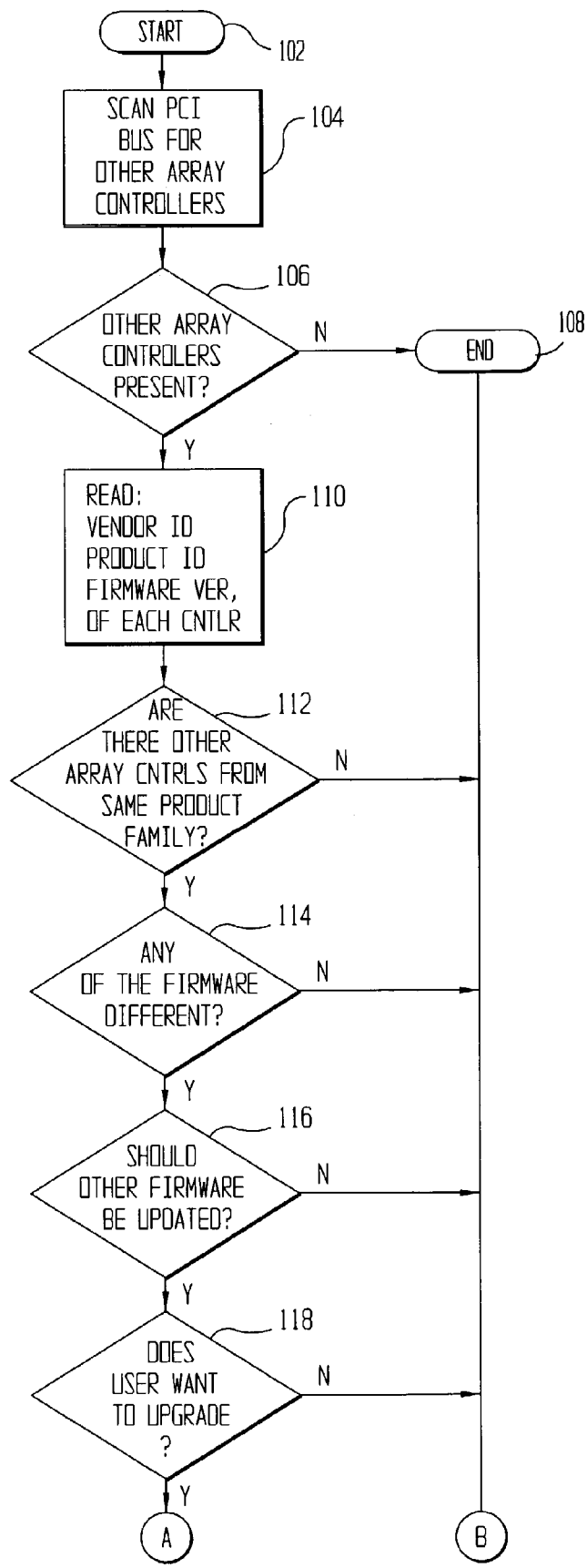
FIG. 4A illustrates a flow diagram of the steps that may be performed in accordance with embodiments of the invention.
Figure 4B:
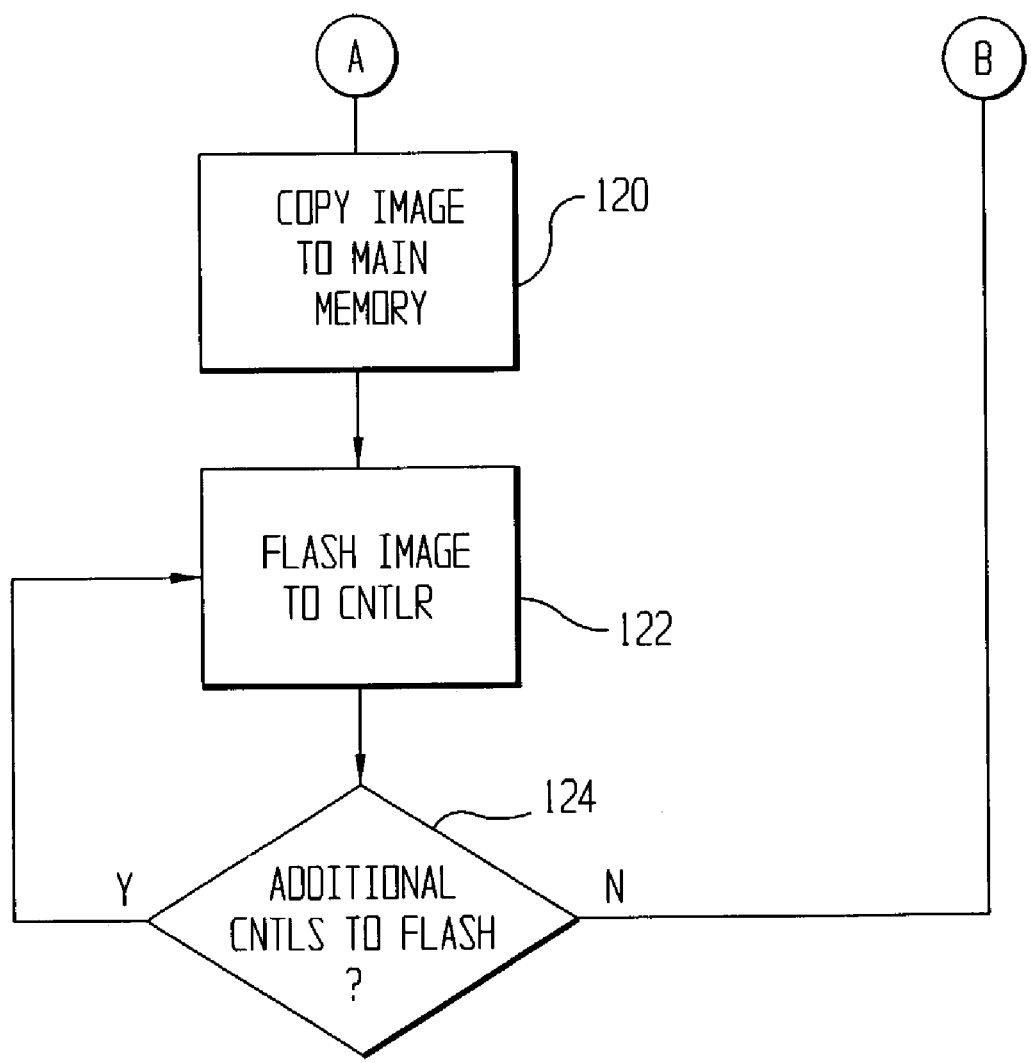
FIG. 4B illustrates a flow diagram of the steps that may be performed in accordance with embodiments of the invention.

Turning now to FIGS. 4A and 4B, in accordance with embodiments of the invention, the EFI option ROM 61 (or if combined with other ROM-based functionality, that portion of the programs on the ROM 60 designated as EFI option ROM) within each of the drive array controllers 50 may comprise programs to implement the flow diagrams of FIGS. 4A and 4B. In particular, the process may start (block 102) and proceed to the program scanning the secondary expansion bus, such as PCI bus 20, for other similar add-in cards, such as drive array controllers (block 104). It should be understood, however, that while the embodiments of the invention described thus far may have the drive array controllers 50 coupled to a PCI bus, any suitable bus now in use, or after developed, may be equivalently utilized.

After scanning the secondary expansion bus (block 104), a determination may be made whether there are other drive array controllers present (block 106). If no other drive array controllers are present within the computer system, the process may simply end (block 108). If, however, additional drive array controllers are present, the next step in the process may be to read information regarding those additional controllers (block 110). In particular, the program may read a vendor identification number (vendor ID), a product identification number (product ID), and/or a representation of a firmware version for each of the controllers (block 110). Thereafter, the program may make a determination as to whether any of the other controllers are of the same product family as the inquiring drive array controller (block 112). If other drive array controllers are from the same product family, the program may make a determination of whether any of the controllers have different firmware (block 114). In some embodiments, this may be a determination of whether the firmware in the additional controllers is newer, better, and/or has updated capabilities as compared to the firmware in the drive array controller whose EFI option ROM is currently being executed. In at least some embodiments of the invention, the determination may be made by comparing firmware version numbers, with newer, better, and/or updated firmware having larger firmware version numbers; however, other mechanisms may be used to identify difference in firmware, such as alphabetic or alpha-numeric listings, and use of these alternative mechanism is within the contemplation of the invention.

If any of the additional controllers have firmware that is different, the program may then make a determination of whether the firmware should be replaced with the firmware image of the drive array controller whose EFI option ROM is currently being executed (block 116). If there are other controllers whose firmware is newer, better, and/or more updated than the firmware of the drive array controller whose EFI option ROM is currently executing, then the newer, better, and/or updated firmware of the additional controller(s) should not be replaced by the current firmware. If this is the case, the process may simply end (block 108). If the drive array controller whose EFI option ROM is executing has the newest, best, and/or most updated firmware, then it may be advantageous to copy, or flash, the firmware image to the remaining controller. In embodiments where age and/or capability of firmware are tracked based on a firmware version number, these determinations may be made by comparisons of firmware version numbers.

The next step in the process may be a determination of whether a user would like to update the firmware in the remaining controllers (block 118). The determination illustrated by block 118 may take many forms. In some embodiments of the invention, a user may select whether to proceed on a controller-by-controller basis. Alternatively, the user may simply affirm a desire to update the firmware image on all the drive array controllers whose firmware version number is older than the firmware of the array controller whose EFI option ROM is currently being executed. In yet other embodiments of the invention, the answer to the question may be determined in advance, and thus no user input at the time of upgrade may be required.

Regardless of the precise mechanism by which the question is answered regarding whether to upgrade the firmware image of a drive array controller, if the question is answered in the affirmative, the program being executed may copy its own firmware image in its entirety to the main memory array 12 of the computer system 100 (block 120 of FIG. 4B). At least some of the drive array controllers may have software images that exceed one megabyte in size. While handling a file whose size exceeds one megabyte may be commonplace in post-boot procedures (with the operating system in charge), handling a file of this size may be more difficult in the pre-boot sequences. However, computer systems operated in compliance with the EFI specification, may ease difficulties in handling large files in pre-boot sequences. In particular, in EFI-compliant systems, addressable memory in the main memory array 12 above the one megabyte boundary may be available for use in the pre-boot sequence. By contrast, in non-EFI-compliant systems, only small portions of the main memory array 12 below the one megabyte boundary may be utilized. Thus, embodiments of the invention operated in an EFI-compliant system may perform the steps identified by block 120 directly; that is, the image may be copied in its entirety to main memory array 12. However, in alternative embodiments of the invention in non-EFI-compliant systems, copying and flashing may be accomplished through a series of smaller copying and flashing steps.

Returning again to FIG. 4B, once the image has been copied to main memory (block 120), the EFI option ROM program may flash the image to a drive array controller whose firmware is being upgraded (block 122). Thus, the EFI option ROM within each drive array controller 50 may comprise program utilities for performing the flash operation.

Once the flash operation is complete, a determination may be made as to whether there are any additional controllers that require firmware updates (block 124). If no other array controllers need an update, the process may end (block 108). If an additional controller or controllers need to be updated, then the process may retreat to the flashing step (block 122) for each additional controller.

The above discussion is meant to be illustrative of the principles and various embodiments of the present invention. Numerous variations and modifications will become apparent to those skilled in the art once the above disclosure is fully appreciated. For example, steps illustrated in FIGS. 4A and 4B may be combined, altered, re-arranged, or omitted without departing from the embodiments of the invention. Scanning for other add-in cards illustrated by block 104 may be combined with reading pertinent information, illustrated by block 112. It is intended that the following claims be interpreted to embrace all such variations and modifications.

What is claimed is:

1. A method comprising:
   determining, by program stored on a first add-in card of a computer system and executed by a processor other than a processor of the first add-in card, if an additional add-in card is present within the computer system;
   comparing firmware images of the add-in cards to determined if differences exist between the firmware images; and
   updating a firmware image of the additional add-in card if differences exist;
   wherein updating the firmware image further comprises updating the firmware image of the additional add-in card using a firmware image of the first add-in card.

2. The method as defined in claim 1 wherein the comparing step further comprises:
   reading a firmware version number of the additional add-in card;
   determining whether a firmware version number of the first add-in card is newer than the firmware version number of the of the additional add-in card; and performing the updating step only if the firmware version number of the first add-in card is newer than the firmware version number of the additional add-in card.

3. The method as defined in claim 1 wherein the determining, comparing and updating steps take place during a pro-boot sequence of the computer system.

4. A computer system comprising:
a central processing unit (CPU);
a main memory array coupled to the CPU;
an expansion bus coupled to the CPU;
a first add-in card coupled to the expansion bus, the first add-in card comprises a non-volatile memory device stores a firmware image that the first add-in card executes, and the first add-in card further comprises a program executable by the CPU;
a second add-in card coupled to the expansion bus, the second add-in card comprising a non-volatile memory device;
wherein the program stored on the first add-in card, when executed, flashes the firmware image to the non-volatile memory of the second add-in card,
wherein the computer system copies at least a portion of the firmware image of the first add-in card to the main memory array prior to flashing the firmware image to the second add-in card.

5. The computer system as defined in claim 4 wherein the computer system copies the entire firmware image of the first add-in card to the main memory array prior to flashing the firmware image to the second add-in card.

6. The computer system as defined in claim 5 wherein the computer system performs the flashing during a pre-boot sequence of the computer.

7. The computer system as defined in claim 4 wherein the secondary expansion bus further comprises a Peripheral Components Interconnect (PCI) bus.

8. The computer system as defined in claim 4 wherein the first and second add-in cards further comprise a first and second drive array controllers.

9. An add-in card for a computer system comprising:
a processor; and
solid state memory device storing executable programs coupled to the processor, the executable programs comprising a firmware image executable by the processor, and an image flashing program executable by a central processing unit (CPU) of a computer system, in which the add-in card couples,
where when executed the image flashing program is further adapted to copy the firmware image, and flash the firmware image to a solid state memory device in a second add-in card coupled in the computer system and, wherein when executed the image flashing program is further adapted to copy the firmware image to a main memory of the computer system.

10. The add-in card for a computer system as defined in claim 9 wherein when executed the image flashing program is further adapted to flash the firmware image from the main memory to the solid state memory of the second add-in card.

11. The add-in card for a computer system as defined in claim 9 wherein when executed the image flashing program is further adapted to read a firmware image version number of the firmware image of the second add-in card, determine whether a firmware image version number of the add-in card is newer than the firmware image version number of the of the second add-in card, and perform the copying and flashing steps only if the firmware image version number of the add-in card is newer than the firmware image version number of the second add-in card.

12. The add-in card for a computer system as defined in claim 9 wherein the add-in card further comprises a drive array controller.

13. A computer system comprising:
a means for executing programs;
a means for storing programs and data coupled to the means for executing;
a means for bus communication coupled to the means for executing;
a first means for control of a hard drive array coupled to the means for bus communication, the first means for control comprising a means for non-volatile storage storing a firmware image comprising programs that the first means for control executes, and wherein the means for non-volatile storage further comprises a program executable by the means for executing;
a second means for control of a hard drive coupled to the means for bus communication, the second means for control comprising a means for non-volatile storage; and
wherein the program stored on the first means for control, when executed, flashes the firmware image to the means for non-volatile storage of the second means for control
wherein the computer system copies at least a portion of the firmware image of the first means for control to the means for storing prior to flashing the firmware images to the second means for control.

* * * * *

UNITED STATES PATENT AND TRADEMARK OFFICE
CERTIFICATE OF CORRECTION

PATENT NO. : 7,080,243 B2
APPLICATION NO. : 10/439141
DATED : July 18, 2006
INVENTOR(S) : Mohammad A. Ramiz et al.

Page 1 of 1

It is certified that error appears in the above-identified patent and that said Letters Patent is hereby corrected as shown below:

In column 6, line 67, in Claim 2, delete "of the" before "additional".

In column 7, line 6, in Claim 3, delete "pro-boot" and insert -- pre-boot --, therefor.

In column 7, line 45, in Claim 9, after "system" delete ",".

In column 7, line 47, in Claim 9, delete "where" and insert -- wherein --, therefor.

In column 8, lines 14-15, in Claim 11, delete "of the" before "second".

In column 8, line 48, in Claim 13, delete "images" and insert -- image --, therefor.

Signed and Sealed this

Third Day of March, 2009

JOHN DOLL
*Acting Director of the United States Patent and Trademark Office*